United States Patent
Lin

(10) Patent No.: US 8,502,778 B2
(45) Date of Patent: Aug. 6, 2013

(54) DUAL-MODE INPUT DEVICE OPERABLE IN A SELECTED ONE OF A RELATIVE COORDINATE MODE AND AN ABSOLUTE COORDINATE MODE

(75) Inventor: Shun-Pin Lin, Taipei County (TW)

(73) Assignees: Sunrex Technology Corp., Taichung Hsien (TW); Gimbal Technology Co., Ltd., Sanchong (TW)

( * ) Notice: Subject to any disclaimer, the term of this patent is extended or adjusted under 35 U.S.C. 154(b) by 467 days.

(21) Appl. No.: 12/834,063

(22) Filed: Jul. 12, 2010

(65) Prior Publication Data
US 2011/0187639 A1     Aug. 4, 2011

(30) Foreign Application Priority Data
Feb. 2, 2010   (TW) .............................. 99202130 U

(51) Int. Cl.
*G06F 3/033*     (2006.01)
(52) U.S. Cl.
USPC .......... 345/163; 345/156; 345/157; 345/162; 345/167
(58) Field of Classification Search
USPC ................................. 345/156–179
See application file for complete search history.

(56) References Cited

U.S. PATENT DOCUMENTS

| | | | | |
|---|---|---|---|---|
| 6,034,672 A * | 3/2000 | Gaultier et al. | | 345/173 |
| 6,329,978 B1 * | 12/2001 | Yeh et al. | | 345/157 |
| 6,388,660 B1 * | 5/2002 | Manser et al. | | 345/173 |
| 2003/0063064 A1 * | 4/2003 | Braun et al. | | 345/156 |
| 2004/0239646 A1 * | 12/2004 | Wang | | 345/173 |
| 2006/0012562 A1 * | 1/2006 | Pope et al. | | 345/156 |
| 2006/0250380 A1 * | 11/2006 | Oliver | | 345/179 |
| 2008/0180412 A1 * | 7/2008 | Tsang | | 345/179 |
| 2008/0259029 A1 * | 10/2008 | Yang et al. | | 345/158 |
| 2011/0022990 A1 * | 1/2011 | Wu et al. | | 715/856 |

* cited by examiner

Primary Examiner — Lun-Yi Lao
Assistant Examiner — Gregory J Tryder
(74) Attorney, Agent, or Firm — Renner, Otto, Boisselle & Sklar, LLP

(57) ABSTRACT

A dual-mode input device includes a relative coordinate generator disposed in a casing for detecting motion of the casing and for generating relative coordinate information based on detected motion of the casing, and a processing unit. The processing unit includes a coordinate storing module for storing absolute coordinate information, an absolute coordinate generator for generating updated absolute coordinate information based on the relative coordinate information received from the relative coordinate generator and the absolute coordinate information received from the coordinate storing module, and for storing the updated absolute coordinate information in the coordinate storing module, and an output selecting module operable in one of a relative coordinate mode, in which the output selecting module outputs the relative coordinate information, and an absolute coordinate mode, in which the output selecting module outputs the absolute coordinate information.

5 Claims, 2 Drawing Sheets

DUAL-MODE INPUT DEVICE OPERABLE IN A SELECTED ONE OF A RELATIVE COORDINATE MODE AND AN ABSOLUTE COORDINATE MODE

CROSS-REFERENCE TO RELATED APPLICATION

This application claims priority of Taiwanese application no. 099202130, filed on Feb. 2, 2010, which is hereby incorporated herein by reference in its entirety.

BACKGROUND OF THE INVENTION

1. Field of the Invention

The invention relates to an input device for a computer, more particularly to a dual-mode input device operable in a selected one of a relative coordinate mode and an absolute coordinate mode.

2. Description of the Related Art

A conventional pointing device, such as a mouse, is used to generate relative coordinate information that is provided to a computer to enable control of motion of a cursor on a display. Whether or not motion of the cursor from a current position to a target position is to be accelerated by the computer is determined from the relative coordinate information.

Since cursor acceleration and the computer operating system may affect motion of the cursor to the target position, the mouse may not be a suitable pointing device in applications that require precise control of the cursor position, such as in handwriting applications, drawing applications, etc. While a computer application program for converting mouse motion into absolute coordinate information has been proposed to alleviate the above drawback, the need to install the computer application program and to allocate computer system resources to execute the computer application program results in inconvenience.

SUMMARY OF THE INVENTION

Therefore, the object of the present invention is to provide a dual-mode input device which is operable in a selected one of a relative coordinate mode and an absolute coordinate mode.

According to the present invention, there is provided a dual-mode input device adapted for use with a computer. The dual-mode input device includes a casing, and a relative coordinate generator disposed in the casing, a processing unit disposed in the casing, coupled electrically to the relative coordinate generator, and a transmission interface coupled electrically to the processing unit. The relative coordinate generator is operable to detect motion of the casing and to generate relative coordinate information based on detected motion of the casing. The processing unit includes: a coordinate storing module for storing absolute coordinate information; an absolute coordinate generator for receiving the relative coordinate information from the relative coordinate generator and the absolute coordinate information from the coordinate storing module, generating updated absolute coordinate information based on the relative coordinate information and the absolute coordinate information, and storing the updated absolute coordinate information in the coordinate storing module; and an output selecting module for receiving the relative coordinate information from the relative coordinate generator and the absolute coordinate information from the coordinate storing module. The output selecting module is operable in a selected one of a relative coordinate mode, in which the output selecting module outputs the relative coordinate information, and an absolute coordinate mode, in which the output selecting module outputs the absolute coordinate information. The transmission interface is operable to transmit the output of the output selecting module to the computer.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
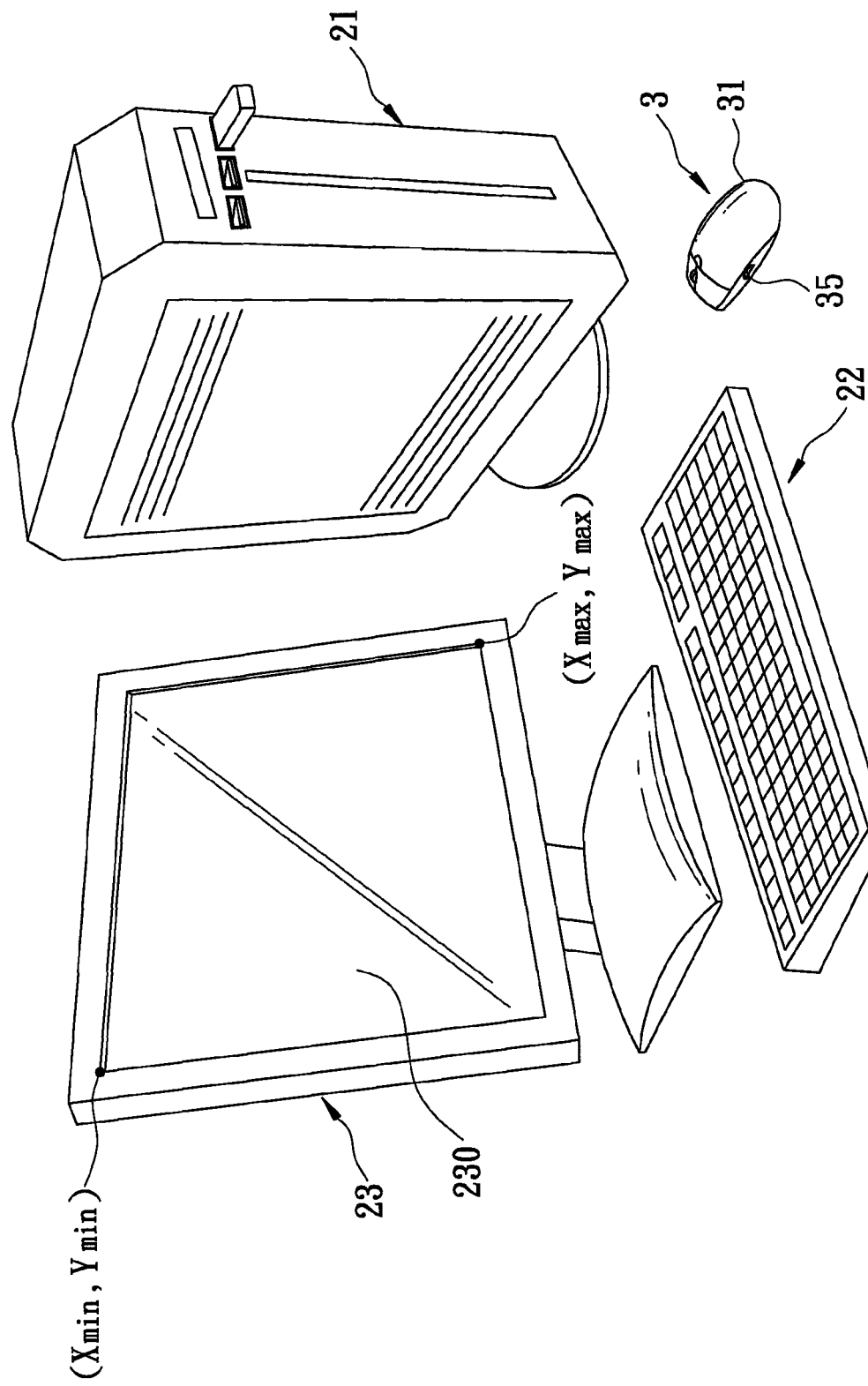
FIG. 1 is a perspective view showing the preferred embodiment of a dual-mode input device according to the present invention when used with a computer.
Figure 2:
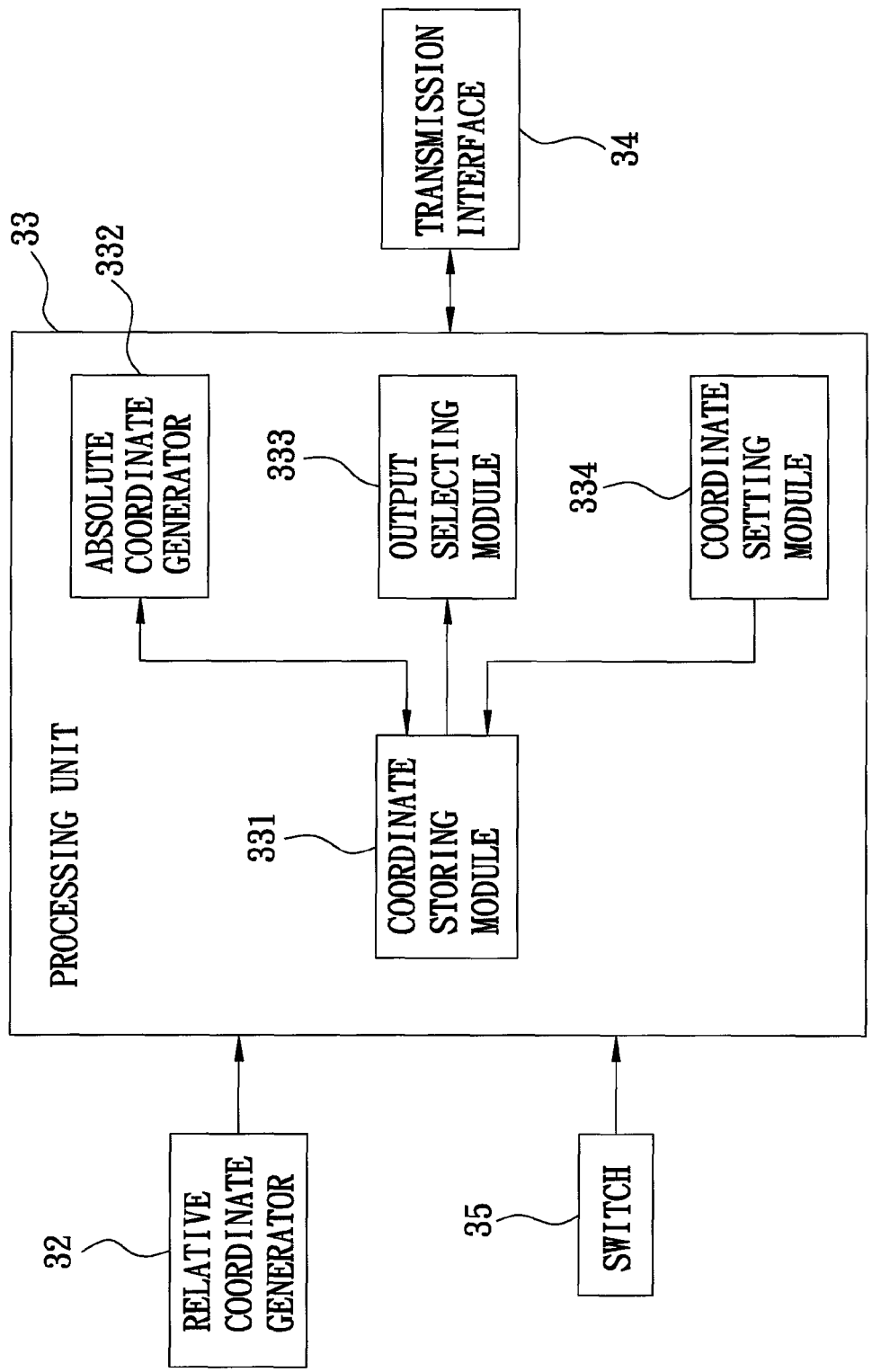
FIG. 2 is a block diagram of the preferred embodiment.

Referring to FIGS. 1 and 2, the preferred embodiment of a dual-mode input device 3 according to the present invention is embodied in a pointing device, which is a mouse in this embodiment. The input device 3 is adapted for use with a conventional computer 21 that is operatively coupled to a keyboard 22 and a display 23. The display 23 includes a screen 230 that has a minimum X-coordinate ($X_{min}$), a minimum Y-coordinate ($Y_{min}$), a maximum X-coordinate ($X_{max}$), and a maximum Y-coordinate ($Y_{max}$). The minimum X-coordinate ($X_{min}$) and the minimum Y-coordinate ($Y_{min}$) correspond to an upper left corner of the screen 230, and the maximum X-coordinate ($X_{max}$) and the maximum Y-coordinate ($Y_{max}$) correspond to a lower right corner of the screen 230.

The dual-mode input device 3 includes a casing 31, a relative coordinate generator 32 disposed in the casing 31, a processing unit 33 disposed in the casing 31 and coupled electrically to the relative coordinate generator 32, and a transmission interface 34 coupled electrically to the processing unit 33. The relative coordinate generator 32 is operable to detect motion of the casing 31 and to generate relative coordinate information based on detected motion of the casing 31 in a conventional manner. The relative coordinate generator 32 may be realized using a known mechanical mechanism, an opto-mechanical mechanism or an optical mechanism commonly found in existing mice. Since the feature of the present invention does not reside in the specific configuration of the relative coordinate generator 32, which may be readily appreciated by those skilled in the art, further details of the same will be omitted herein for the sake of brevity.

The processing unit 33 includes a coordinate storing module 331, an absolute coordinate generator 332, and an output selecting module 333. The coordinate storing module 331 stores absolute coordinate information. The absolute coordinate generator 332 receives the relative coordinate information from the relative coordinate generator 32 and the absolute coordinate information from the coordinate storing module 331. The absolute coordinate generator 332 then generates updated absolute coordinate information based on the relative coordinate information and the absolute coordinate information, and stores the updated absolute coordinate information in the coordinate storing module 331. The output selecting module 333 receives the relative coordinate information from the relative coordinate generator 32 and the absolute coordinate information from the coordinate storing module 331. The output selecting module 333 is operable in a selected one of a relative coordinate mode, in which the output selecting module 333 outputs the relative coordinate information, and an absolute coordinate mode, in which the output selecting module 333 outputs the absolute coordinate information.

The aforementioned components of the processing unit 33 may be realized using wired logics, circuits, firmware or a microprocessor executing proprietary program instructions, which may be readily appreciated by those skilled in the art and which will not be detailed herein for the sake of brevity.

The transmission interface 34 is operable to transmit the output of the output selecting module 333 to the computer 21 in a known manner. The transmission interface 34 may be a wired interface complying with wired connectivity standards, such as RS-232C, PS/2, ADB or USB, or a wireless interface complying with wireless connectivity standards, such as infrared radiation (IrDA) or radio (including Bluetooth).

In this embodiment, the processing unit 33 receives screen resolution information from the computer 21 via the transmission interface 34. The processing unit 33 further includes a coordinate setting module 334, which may be realized using wired logics, circuits, firmware or a microprocessor executing proprietary program instructions. The coordinate setting module 334 generates and stores initial absolute coordinate information corresponding to the screen resolution information in the coordinate storing module 331. It is noted that the computer 21 is installed with device drivers for the display 23 and the dual-mode input device 3. Through the device drivers, the screen resolution information may be determined by the computer 21 and transmitted to the dual-mode input device 3. Hence, when a user changes a configuration of the screen resolution, such information can be transmitted to the dual-mode input device 3.

Preferably, the screen resolution information includes the maximum X-coordinate ($X_{max}$) and the maximum Y-coordinate ($Y_{max}$). The initial absolute coordinate information includes an initial absolute X-coordinate (@X) and an initial absolute Y-coordinate (@Y) and defines an origin of the screen 230. The coordinate setting module 334 generates the initial absolute X-coordinate (@X) as one-half of the maximum X-coordinate ($X_{max}$), and the initial absolute Y-coordinate (@Y) as one-half of the maximum Y-coordinate ($Y_{max}$). For instance, if the screen 230 has a resolution of 1280×1024, the initial absolute X-coordinate and Y-coordinate (@X, @Y) are (640, 512).

It is noted that the coordinate setting module 334 may be dispensed with in other embodiments of this invention. In such embodiments, the computer 21 may be configured, through the device driver of the dual-mode input device 3, to generate the initial absolute X-coordinate and Y-coordinate (@X, @Y) and transmit the same to the processing unit 33 via the transmission interface 34.

In this embodiment, the relative coordinate information includes X-displacement data ($\Delta X$) and Y-displacement data ($\Delta Y$), and the absolute coordinate information includes the absolute X-coordinate (@X) and the absolute Y-coordinate (@Y). The absolute coordinate generator 332 generates the updated absolute coordinate information as a sum of the absolute X-coordinate (@X) and the X-displacement data ($\Delta X$) (i.e., @X=@X+$\Delta X$) and a sum of the absolute Y-coordinate (@Y) and the Y-displacement data ($\Delta Y$) (i.e., @Y=@Y+$\Delta Y$).

As mentioned above, the processing unit 33 receives the screen resolution information from the computer 21 via the transmission interface 34. In this embodiment, aside from the maximum X-coordinate ($X_{max}$) and the maximum Y-coordinate ($Y_{max}$), the screen resolution information further includes the minimum X-coordinate ($X_{min}$) and the minimum Y-coordinate ($Y_{min}$). The absolute coordinate generator 332 uses the maximum X-coordinate ($X_{max}$) as the updated absolute X-coordinate (@X) when the sum of the absolute X-coordinate (@X) and the X-displacement data ($\Delta X$) is greater than the maximum X-coordinate ($X_{max}$). The absolute coordinate generator 332 uses the maximum Y-coordinate ($Y_{max}$) as the updated absolute Y-coordinate (@Y) when the sum of the absolute Y-coordinate (@Y) and the Y-displacement data ($\Delta Y$) is greater than the maximum Y-coordinate ($Y_{max}$). The absolute coordinate generator 332 uses the minimum X-coordinate ($X_{min}$) as the updated absolute X-coordinate (@X) when the sum of the absolute X-coordinate (@X) and the X-displacement data ($\Delta X$) is less than the minimum X-coordinate ($X_{min}$). The absolute coordinate generator 332 uses the minimum Y-coordinate ($Y_{min}$) as the updated absolute Y-coordinate (@Y) when the sum of the absolute Y-coordinate (@Y) and the Y-displacement data ($\Delta Y$) is less than the minimum Y-coordinate ($Y_{min}$). Accordingly, the position of the cursor may be confined within the area of the screen 230.

In other embodiments, the absolute coordinate generator 332 may generate the updated absolute X-coordinate and absolute Y-coordinate (@X, @Y) without referring to the values of the maximum and minimum X-coordinate and Y-coordinate ($X_{max}$, $Y_{max}$, $X_{min}$, $Y_{min}$). In such embodiments, the computer 21 may be configured, through the device driver of the dual-mode input device 3, to refer to the values of the maximum and minimum X-coordinate and Y-coordinate ($X_{max}$, $Y_{max}$, $X_{min}$, $Y_{min}$) so as to ensure that the position of the cursor may be confined within the area of the screen 230.

In this embodiment, the dual-mode input device 3 further includes a switch 35 mounted on the casing 31 and coupled electrically to the processing unit 33. The output selecting module 333 operates in the selected one of the relative coordinate mode and the absolute coordinate mode according to state of the switch 35.

Preferably, the switch 35 is a two-position mechanical switch, i.e., a two-position slider switch. Each switch position corresponds to a respective one of the relative coordinate mode and the absolute coordinate mode. Those skilled in the art may readily appreciate that other types of switches, such as a push button switch, may be used in the present invention.

In other embodiments of this invention, the computer 21 may be configured, through the device driver of the dual-mode input device 3, to set operation of the output selecting module 333 in the selected one of the relative coordinate mode and the absolute coordinate mode by transmitting mode-setting information to the processing unit 33 via the transmission interface 34, thereby dispensing with the need to provide the switch 35.

Moreover, in embodiments where the various components of the processing unit 33 are realized using wired logic or circuits, the components of the processing unit 33 may be configured to receive information from the computer 21 through the transmission interface 34.

According to this invention, the dual-mode input device 3 may be easily switched to generate relative coordinate information or absolute coordinate information. Since the computer 21 is no longer required to compute the absolute coordinate information, system resources of the computer 21 may be saved.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A dual-mode input device adapted for use with a computer, said dual-mode input device comprising:
   a casing;
   a relative coordinate generator disposed in said casing, for detecting motion of said casing, and generating relative coordinate information based on detected motion of said casing;
   a processing unit disposed in said casing, and coupled electrically to said relative coordinate generator, said processing unit including
      a coordinate storing module for storing absolute coordinate information,
      an absolute coordinate generator for receiving the relative coordinate information from said relative coordinate generator and the absolute coordinate information from said coordinate storing module, generating updated absolute coordinate information based on the relative coordinate information and the absolute coordinate information, and storing the updated absolute coordinate information in said coordinate storing module, and
      an output selecting module for receiving the relative coordinate information from said relative coordinate generator and the absolute coordinate information from said coordinate storing module, said output selecting module being operable in a selected one of a relative coordinate mode, in which said output selecting module outputs the relative coordinate information, and an absolute coordinate mode, in which said output selecting module outputs the absolute coordinate information; and
   a transmission interface coupled electrically to said processing unit and operable to transmit the output of said output selecting module to the computer;
   wherein said processing unit receives screen resolution information from the computer via said transmission interface and further includes a coordinate setting module for generating and storing initial absolute coordinate information corresponding to the screen resolution information in said coordinate storing module.

2. The dual-mode input device according to claim 1, wherein the screen resolution information includes a maximum X-coordinate and a maximum Y-coordinate, the initial absolute coordinate information includes an initial absolute X-coordinate and an initial absolute Y-coordinate, and said coordinate setting module generates the initial absolute X-coordinate as one-half of the maximum X-coordinate, and the initial absolute Y-coordinate as one-half of the maximum Y-coordinate.

3. The dual-mode input device as claimed in claim 1, further comprising a switch mounted on said casing and coupled electrically to said processing unit, said output selecting module operating in the selected one of the relative coordinate mode and the absolute coordinate mode according to state of said switch.

4. The dual-mode input device as claimed in claim 3, wherein said switch is a two-position mechanical switch.

5. A dual-mode input device adapted for use with a computer, said dual-mode input device comprising:
   a casing;
   a relative coordinate generator disposed in said casing, for detecting motion of said casing, and generating relative coordinate information based on detected motion of said casing;
   a processing unit disposed in said casing, and coupled electrically to said relative coordinate generator, said processing unit including
      a coordinate storing module for storing absolute coordinate information,
      an absolute coordinate generator for receiving the relative coordinate information from said relative coordinate generator and the absolute coordinate information from said coordinate storing module, generating updated absolute coordinate information based on the relative coordinate information and the absolute coordinate information, and storing the updated absolute coordinate information in said coordinate storing module, and
      an output selecting module for receiving the relative coordinate information from said relative coordinate generator and the absolute coordinate information from said coordinate storing module, said output selecting module being operable in a selected one of a relative coordinate mode, in which said output selecting module outputs the relative coordinate information, and an absolute coordinate mode, in which said output selecting module outputs the absolute coordinate information; and
   a transmission interface coupled electrically to said processing unit and operable to transmit the output of said output selecting module to the computer;
   wherein the relative coordinate information includes X-displacement data and Y-displacement data, the absolute coordinate information includes an absolute X-coordinate and an absolute Y-coordinate, and said absolute coordinate generator generates the updated absolute coordinate information as a sum of the absolute X-coordinate and the X-displacement data and a sum of the absolute Y-coordinate and the Y-displacement data;
   wherein said processing unit receives screen resolution information from the computer via said transmission interface, the screen resolution information including a maximum X-coordinate, a maximum Y-coordinate, a minimum X-coordinate, and a minimum Y-coordinate, said absolute coordinate generator using the maximum X-coordinate as the updated absolute X-coordinate when the sum of the absolute X-coordinate and the X-displacement data is greater than the maximum X-coordinate, using the maximum Y-coordinate as the updated absolute Y-coordinate when the sum of the absolute Y-coordinate and the Y-displacement data is greater than the maximum Y-coordinate, using the minimum X-coordinate as the updated absolute X-coordinate when the sum of the absolute X-coordinate and the X-displacement data is less than the minimum X-coordinate, and using the minimum Y-coordinate as the updated absolute Y-coordinate when the sum of the absolute Y-coordinate and the Y-displacement data is less than the minimum Y-coordinate.

* * * * *